United States Patent [19]

Schmoyer

[11] 4,031,797
[45] June 28, 1977

[54] POCKET-SIZE MUSICAL CHORD STUDY AID

[76] Inventor: Arthur R. Schmoyer, The Cedars, Rte. 16, Woolford, Md. 21677

[22] Filed: Feb. 20, 1976

[21] Appl. No.: 659,978

Related U.S. Application Data

[63] Continuation-in-part of Ser. No. 578,032, May 16, 1975, Pat. No. 3,954,040.

[52] U.S. Cl. .............................. 84/470; 84/417 R; 84/478
[51] Int. Cl.² ........................................ G09B 15/00
[58] Field of Search ............ 84/470, 478, 471, 483, 84/484, 485

[56] References Cited

UNITED STATES PATENTS

| | | |
|---|---|---|
| 3,335,630 | 8/1967 | Schmoyer ............................ 84/478 |
| 3,503,296 | 3/1970 | Schmoyer et al. .................... 84/478 |
| 3,503,297 | 3/1970 | Schmoyer et al. .................... 84/478 |
| 3,664,036 | 5/1972 | Boswell, Jr. et al. ................. 84/478 |
| 3,897,710 | 8/1975 | Schmoyer ............................ 84/478 |
| 3,954,040 | 5/1976 | Schmoyer ............................ 84/478 |

Primary Examiner—Stephen J. Tomsky
Attorney, Agent, or Firm—Sixbey, Bradford & Carlson

[57] ABSTRACT

A self-contained unit similar to a conventional pocket calculator provides indications of the make-up of musical chord triads for use as a self-study aid.

9 Claims, 9 Drawing Figures

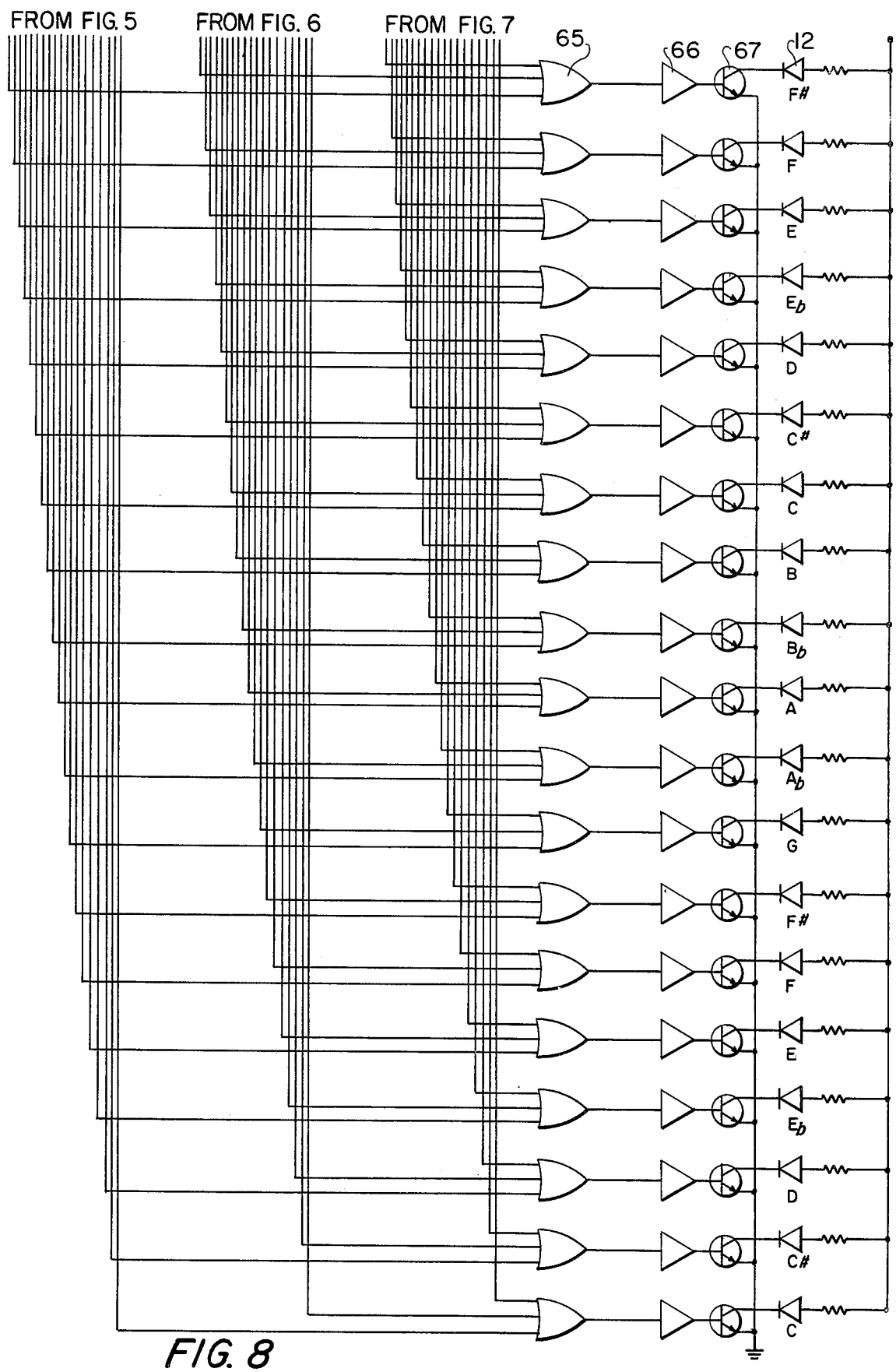

POCKET-SIZE MUSICAL CHORD STUDY AID

RELATED APPLICATIONS

This application is a continuation-in-part of my application Ser. No. 578,032, filed May 16, 1975, now U.S. Pat. No. 3,954,040.

ENVIRONMENT OF INVENTION

This invention relates generally to the field of music instruction devices, and particularly to devices to aid in instruction in the formation of chords.

BACKGROUND OF INVENTION - PRIOR ART

In several earlier patents of common inventorship to this application there have been revealed teaching apparatus wherein illuminable indicators serve to identify individual notes which when sounded together form a triad. These U.S. Pat. Nos. include the following:

3,335,630 - issued Aug. 15, 1967; 3,503,296 - issued Mar. 31, 1970; 3,503,297 - issued Mar. 31, 1970; 3,664,036 - issued May 23, 1970; 3,897,710 - issued Aug. 5, 1975.

While the above-identified patents disclose teaching apparatus which, in some instances, may be utilized apart from the musical instrument itself, they are primarily designed for instruction in the actual manipulation of keys of a keyboard musical instrument where the student is manipulating the keys so as to sound the instrument at the same time that he is receiving instructional stimulus from the illuminable display.

SUMMARY OF THIS INVENTION

In contradistinction to the foregoing, it is an object of this invention to provide a device which can serve as a music study aid for use by the student away from the musical instrument itself. To this end, this invention provides a pocket size study aid which may readily be carried by the student and used at any location without the necessity for elaborate equipment set-ups or distracting visual or audio displays. The study aid takes the general form of the well known self-contained pocket calculator including push-button switches and a display energized by the switches in a unique way by which the display goes through a smooth transition from chord to chord during the keying of a given sequence.

OBJECTS OF THE INVENTION

Among the objects of this invention are:
1. the provision of a study aid for personal use by a single student,
2. the provision of such an aid which is of compact size so as to be readily carried, as in the pocket of the user,
3. the provision of a study aid in which a smooth transition is made between chord indications to facilitate the study of keyboard fingering movements,
4. the provision of a study aid in which a desired chord triad is displayed by illuminated indicators, and the identity of the chord is confirmed by flashing of one of those indicators.

DESCRIPTION OF DRAWINGS

The aforestated and other self-evident objectives and advantages will be better understood by a consideration of the ensuing specification, claims, and drawings, in which:

FIG. 4 is a chart of the partitioning and distribution among FIGS. 5-8 of a schematic diagram of a second embodiment of this invention.

GENERAL DESCRIPTION OF THE INVENTION

Figure 1:
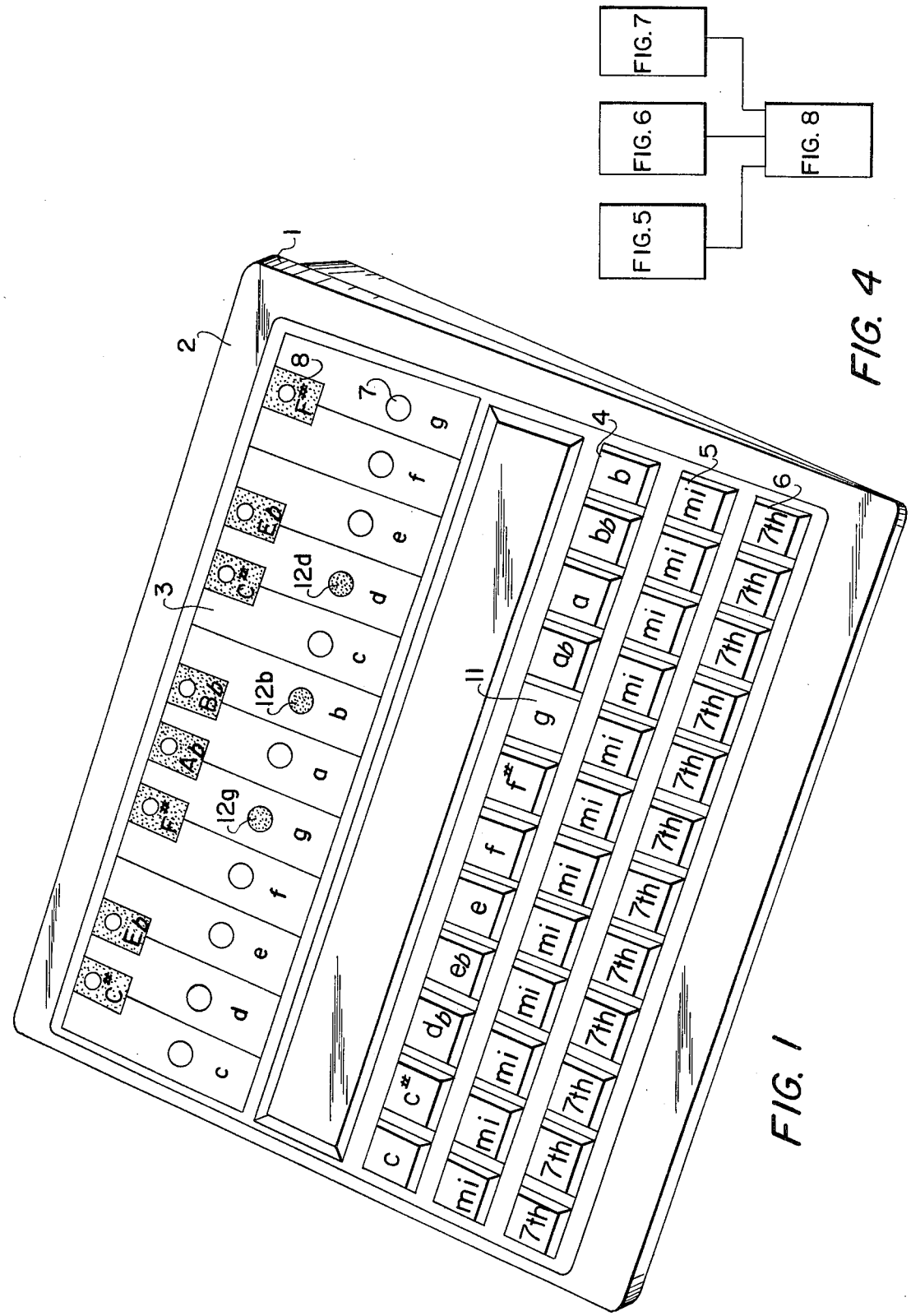
FIG. 1 is a perspective view of a study aid constructed in accordance with this invention.

Referring to FIG. 1, the study aid of this invention comprises a casing dimensioned to be readily portable, preferably dimensioned to fit within a pocket of a user. While the actual size of the casing is not in any way critical, a preferred range is from three to five inches in height and five to seven inches in width.

The casing includes an upper face 2 upon which is disposed an indicator panel 3 and one or more keyboards. In the illustrated embodiment, three keyboards comprise a major chord keyboard (top row 4), a minor chord keyboard (middle row 5), and a seventh chord keyboard (bottom row 6). The indicator panel includes indicia representative of a musical instrument keyboard, together with activatable indicators such as light emitting diodes (LEDs) 7 of the white keys, and LEDS 8 for the black keys. In the drawing, certain LEDs designated 12a, 12b, and 12d are shown in black to indicate an illuminated state existing after depression of the key 11 for the major chord of G. The details of construction of the casing, indicator and keyboard form no part of this invention, and hence are not illustrated. However, an example of suitable constructions can be found in a wide variety of well known pocket calculators, one of which is set forth in U.S. Pat. No. 3,843,851, issued Oct. 22, 1974.

In one embodiment of a study aid made in accordance with this invention, an additional LED indicator 13 is disposed within each key by which a chord is identified. Again, the structure of such a key including an LED indicator forms no part of this invention and is not shown, but an example may be seen by reference to U.S. Pat. No. 3,766,350, issued Oct. 16, 1973.

The illustrated embodiments are exemplary only, and are susceptible of numerous modifications of arrangements and of either simplified or more complex models. Thus it will be readily apparent that a simplified unit may be produced which includes only the major chord keyboard 4 and/or has no provision for chord identification, such as the key mounted LED. Another modification which will be described in the ensuing description of the logic circuitry employed in the study aid of this invention eliminates the key mounted LED but provides confirmation that the indicated chord is the desired chord by causing flashing of the display panel indicator which identifies the individual note by which the chord is identified, i.e., in the illustrated instance the LED 12g would flash to confirm that the chord triad is G chord. In the case of more complex models, additional keyboards for diminished chords, augmented chords, and/or sixth chords could be added employing the teaching of this specification and without the necessity of the exercise of experimentation or invention.

GENERAL OPERATION OF THE INVENTION

In the use of this device a student is not only assisted in studying the make-up of the various chord triads within the capability of the particular embodiment employed, but more importantly is able to successively trigger the unit through a progression of chords to study the relationships (i.e., similarities and differences) between successive chords in the chosen sequence. To this end, the display of each chord is retained until the next chord in sequence is triggered by depression of a key. Upon triggering, only a note which differs from that of the previous chord is extinguished and replaced by illumination of another note indicator, those common to the two successive chords remaining in a steady state of illumination. Thus, the attention of the student is attracted to the changed note, and the study device accentuates the difference between the two chords. By alternately depressing the same two keys, the indication of the changed note can be caused to switch back and forth and prolong the accentuation of the indicated difference between the two chords.

In addition to identifying the individual keys which make up a chord triad, it is desirable to provide the student with a designation of the note by which the chord is known, e.g., the bass note, thus confirming that he has depressed the intended key. This may be accomplished by either of two means, both of which are within the concept of this invention.

In the first means, confirmation is established by an LED indicator which is provided under each key and is illuminated upon depression of that key. As in the case of the note identification LEDs, the keyboard LED remains illuminated until a different key is depressed, thus retaining for the student a designation of the last chord which he keyed. In a second means, no LEDs are necessary in the keyboard, and chord confirmation is established by causing the single note of the triad which designates the chord to flash, the other two notes remaining in a steady state of illumination.

DESCRIPTION OF ELECTRONIC CIRCUITRY

Figure 2:
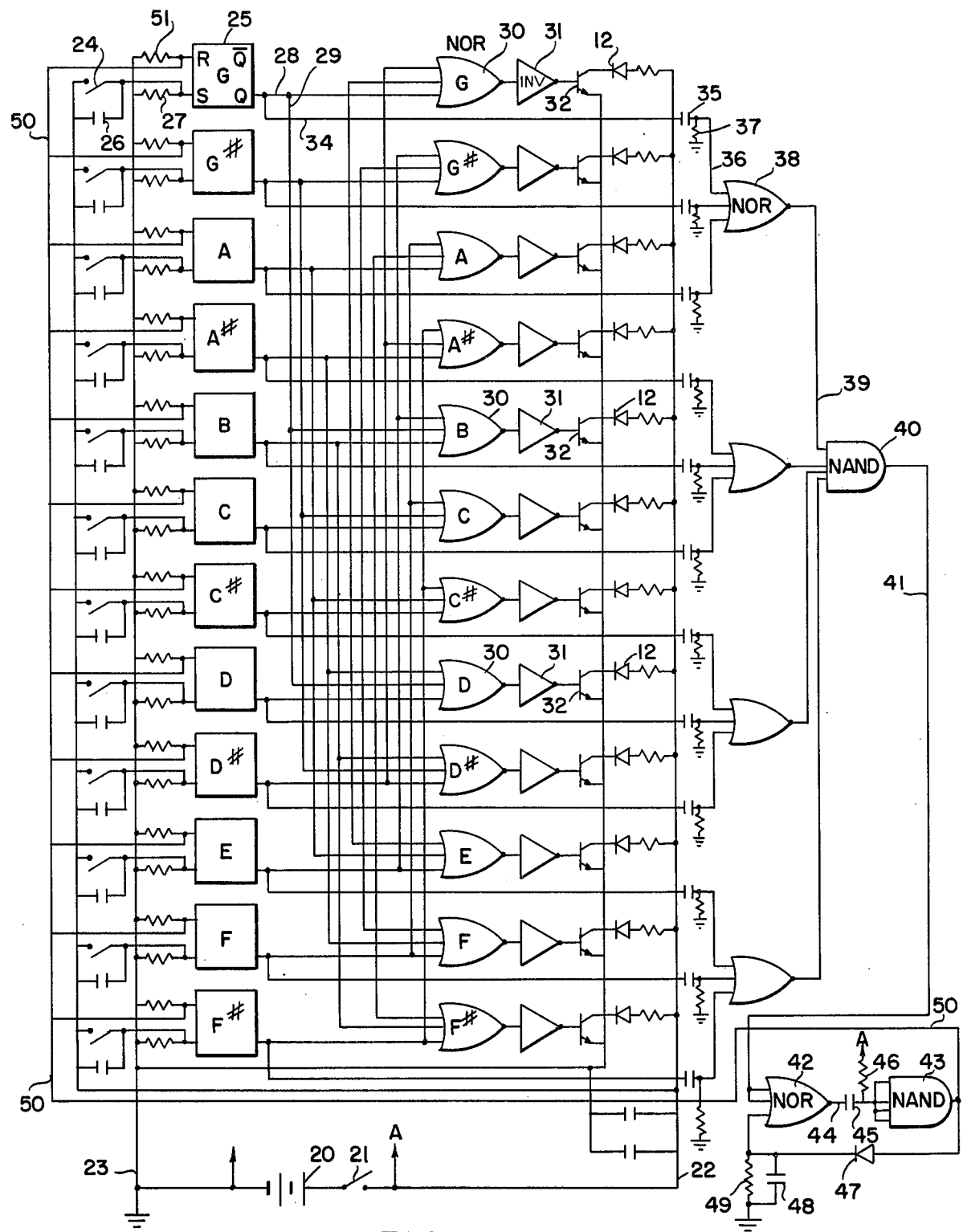
FIG. 2 is a schematic diagram of one embodiment of this invention.

Considering first a simple embodiment limited to illumination of three chord note indicators (without confirmation of the chord designation), and referring to FIG. 2, electronic logic circuitry is shown schematically to include an energy source such as a self-contained battery 20 effective through an ON-OFF switch 21 to energize a positive bus 22 relative to circuit ground 23. Each key 11 is effective upon depression to provide a signal, as by closure of switch 24, the signal being conducted to the set input of flip-flop 25. This flip-flop is conventional design which, in a preferred embodiment, is one half of an RCA No. CD4013, Dual D-type flip-flop. A CD4013A is an integrated circuit consisting of two identical, independent data type flip-flops, each having an independent data, set, reset, and clock inputs and Q and Q̄ outputs. In its use in this circuit as a static flip-flop, the data and clock inputs are not used, hence are not shown for purposes of brevity and clarity. Application of the key closure signal to the set input of flip-flop 25 for the key of G triggers the corresponding flip-flop to provide a stable state output at Q. Upon subsequent opening of the key switch 24, the signal at the set input is bled to ground by the discharge of capacitor 26 through resistor 27. The output at Q terminal for the flip-flop 25 of the G key is applied through lead 28 and bus 29 to an input of NOR elements 30 for each of the chord triad notes G, B, and D. NOR element may be part of an RCA type CD4025 digital integrated circuit, each said element comprising three inputs and effective to provide a low output when a signal is present at any one of its inputs. Thus, output signals present at NOR elements 30 for the keys G, B, and D are fed through respective inverting buffer amplifiers 31 and corresponding driving transistors 32 to chord triad identifier lights 12, which take the form of light emitting diodes. A prototype model utilizes an RCA type CD4049 or CD4009 COS/MOS Hex Buffer/Converter used as the inverter 31, a general purpose high current NPN transistor of type CA 308 monolithic silicon as LED driving transistors 32, and conventional HP 5082-4584 or similar LED as identifier lights 12.

At the same time that the signal derived from the Q output of flip-flop 25 for the key of B is applied to circuitry for activating the triad identifier lights 12 for the chord G, B and D in the aforedescribed manner, the signal is also applied via lead 34 through coupling capacitor 35 to one input 36 of NOR element 38, which also is of RCA type CD4025. Resistor 37 acts with capacitor 35 to form a differentiating cirucit which provides a leakage path to maintain the NOR input 36 at neutral to avoid voltage build-up during periods between signal reception. The resultant momentary signal input at NOR element 38 is effective to switch the output 39 from a normal high to a low condition applied to an input of NAND gate 40, which may be of RCA type CD4012. In the absence of a momentary signal pulse at 39, each input to NAND gate 40 is high, thus maintaining output 41 low. The application of the pulsed output of a NOR element 38 to any input of NAND gate 40 is thus effective to provide a momentary high signal at 41 which is applied to a monostable multivibrator circuit comprising NOR element 42 and NAND element 43 of conventional circuitry. Specifically, the momentary (pulsed) high signal at an input of NOR 42 effects a low pulse at 44 which is applied through coupling capacitor to commonly wired inputs of NAND gate 43, the inputs being maintained normally high by connection through resistor 46 to the high side of battery 20 through connections indicated A, A. By virtue of the commoned inputs to NAND element 43, the element functions as an inverter in which the output is always in the opposite logic state as the input. Hence, a low pulse at the commoned inputs provides a high pulse at the output which in turn is applied through commutating diode 47 to an input of NOR element 43 to hold its output at low. At the same time, capacitor 48 becomes charged and subsequently leaks off through resistor 49 to return the output of NOR element 42 to low. All inputs now being at low, the multivibrator returns to its original state.

The high pulse at the output of NAND element 43 is transmitted through conductor bus 50 to the reset input of all flip-flops 25 simultaneously. Thus, the entire logic system is returned to the original logic state wherein all indicators 12 are OFF, and the system is set to repeat itself upon activation of a set input of either the same flip flop 25 (where a sequence of the same bass note-chord combination is to follow) or a different flip flop 25 (where there is a change in the bass note key which is depressed).

In the first instance, i.e. where the same bass note key has been depressed twice in succession, the fleeting momentary nature of the reset input pulse provided by NAND element 43 is outlasted by the relatively slow manipulative speed of a student, to the extent that key switch 24 for the same flip flop that had been previously set remains closed after the reset bus has returned to low by bleed off through resistor 51. Thus, the flip flop resets and again sets virtually instantaneously, there being no discernible change in the illumination state of chord identifier lights 12. Effectively, i.e. insofar as is discernible at the speed of visual perception, this operation defeats the release of the latching means.

In the instance where the music calls for a change in the chord and consequently a root note key other than that of the flip-flop which previously was set is now depressed, the reset of the previously set flip flop 25 is effective to extinguish the chord triad identifiers controlled by that flip-flop, and the set of the newly selected flip-flop is effective to activate a corresponding triad of different identifiers 12.

The result is that the logic system will respond to a selected root note key to activate a given triad of chord identifier lights and will latch the given triad of lights in the illuminated state through any number of successive activations of the same root note key, but upon, and only upon the activation of a different root note key will it extinguish the latched triad of identifiers and activate a different triad which corresponds to the different root note key.

Figure 3:
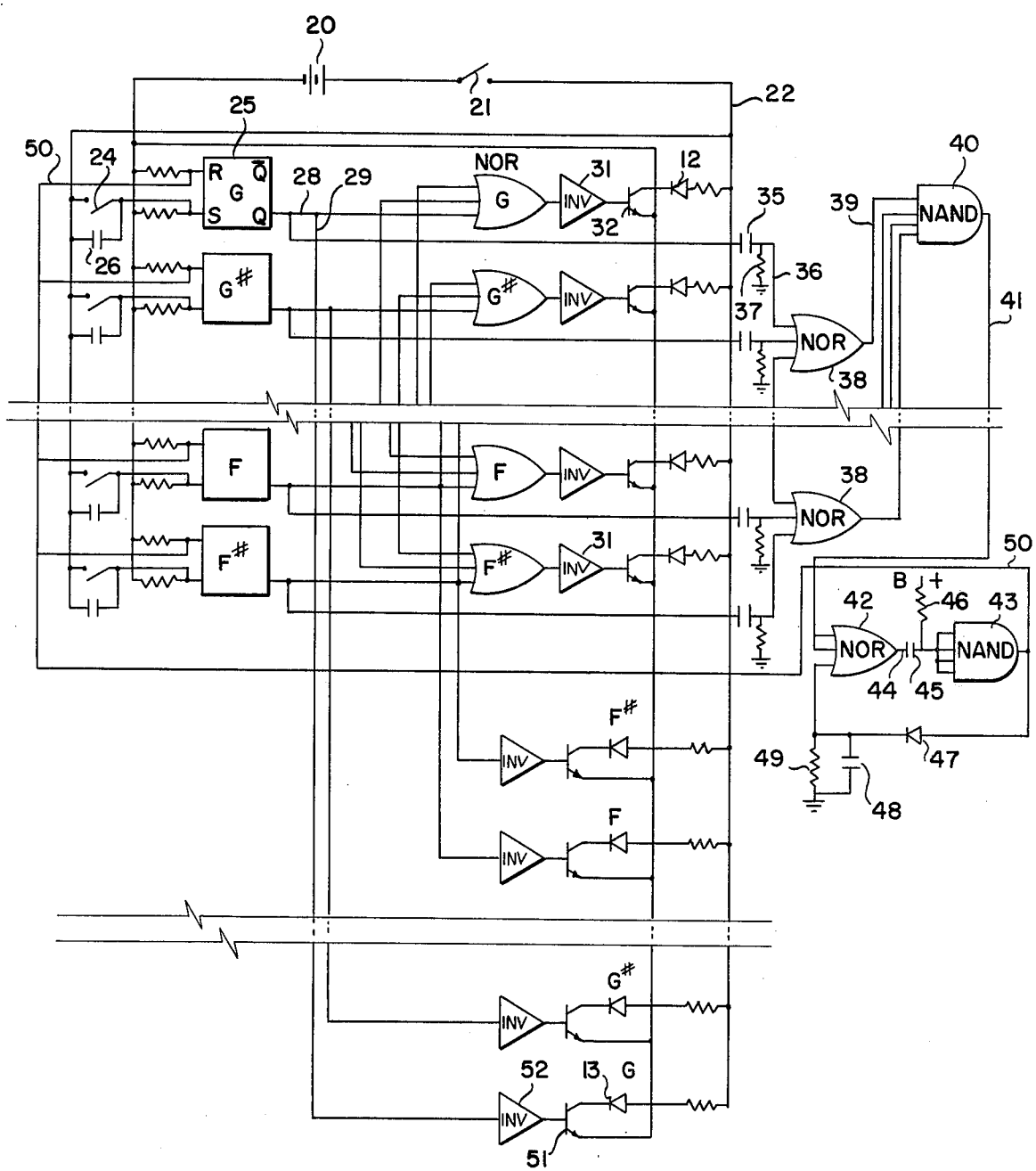
FIG. 3 is a schematic diagram of a variant of the embodiment of FIG. 2.

FIG. 3 is a schematic of a logic system similar to that of FIG. 2 in major regards, but providing for the additional feature of root note confirmatory lights 13. In accordance with a preferred embodiment, these confirmatory lights 13 are disposed within respective keys 11. In the interest of brevity, the schematic is broken to omit redundant circuitry of intermediate keys which functions in the same manner as that described herein. To this end, each root note key is provided with a confirmatory indicator 13, which may be a light emitting diode of RCA type HP 5082-4684, each LED being driven in a fashion similar to indicators 12, namely a transistor driver 51 and an inverter 52. Each inverter 52 has its inputs connected to a corresponding bus 29, which bus is activated as in the manner of FIG. 2 by the output Q of flip-flop 25. Thus, root note confirmatory light 13 becomes illuminated upon the set condition of corresponding flip flop 25, and remains in the illuminated state until the flip flop is reset. Accordingly, there is provided a root note indicator driving circuit which acts independently of the triad indicator drive circuits to illuminate root note confirmatory indicators 13, and latches the appropriate root note indicator in the illuminated state until sensing the depression of a different root note key.

The aforedescribed circuitry is employed in a study aid which is limited to 12 keys and 12 chord note indicators. Hence, certain chords are indicated in the fundamental, others in the second inversion, and still others in the first inversion, as is evident from the following truth table of major chords, in which asterisks indicate chord confirmation lights and circles indicate chord note identifier lights:

|  | G | A♭ | A | B♭ | B | C | D♭ | D | E♭ | E | F | F# |
|---|---|---|---|---|---|---|---|---|---|---|---|---|
|  | * |   |   |   | 0 |   |   | 0 |   |   |   |   |
|  |   | * |   |   |   | 0 |   |   | 0 |   |   |   |
| Fundamental |   |   | * |   |   |   | 0 |   |   | 0 |   |   |
|  |   |   |   | * |   |   |   | 0 |   |   | 0 |   |
|  |   |   |   |   | * |   |   |   | 0 |   |   | 0 |
|  | 0 |   |   |   |   | * |   |   |   | 0 |   |   |
| 2nd Inversion |   |   |   |   |   |   | * |   |   |   | 0 |   |
|  |   | 0 |   |   |   |   |   | * |   |   |   | 0 |
|  | 0 |   |   | 0 |   |   |   |   | * |   |   |   |
| 1st Inversion |   | 0 |   |   | 0 |   |   |   |   | * |   |   |
|  |   |   | 0 |   |   | 0 |   |   |   |   | * |   |
|  |   |   |   | 0 |   |   | 0 |   |   |   |   | * |

Figures 5, 6, 7, 8:
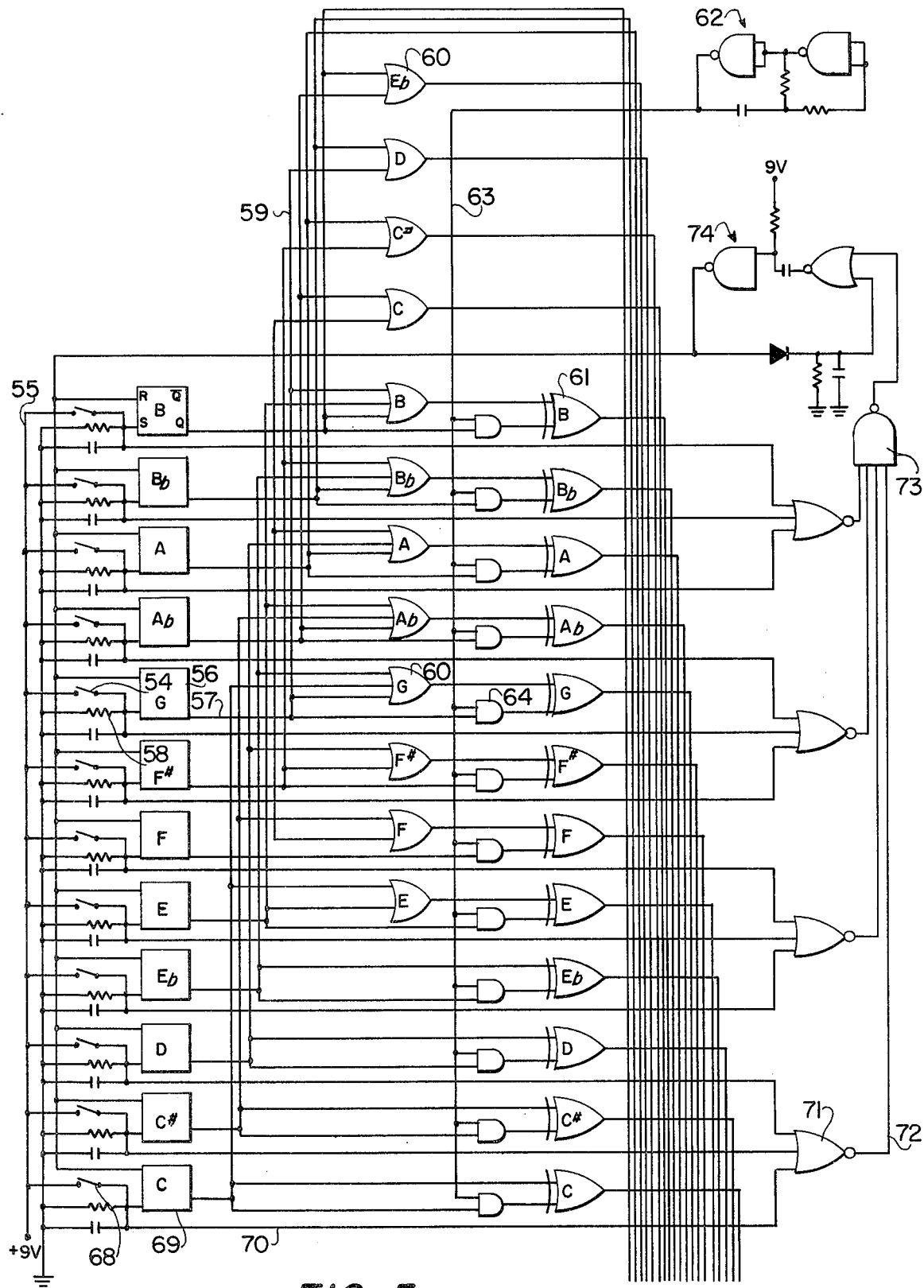
FIG. 5 is a schematic diagram of the keying circuit for major chords.
FIG. 6 is a schematic diagram of the keying circuit for minor chords.
FIG. 7 is a schematic diagram of the keying circuit for seventh chords.
FIG. 8 is a schematic diagram of the indicator circuit.
Figures 6, 7, 8:
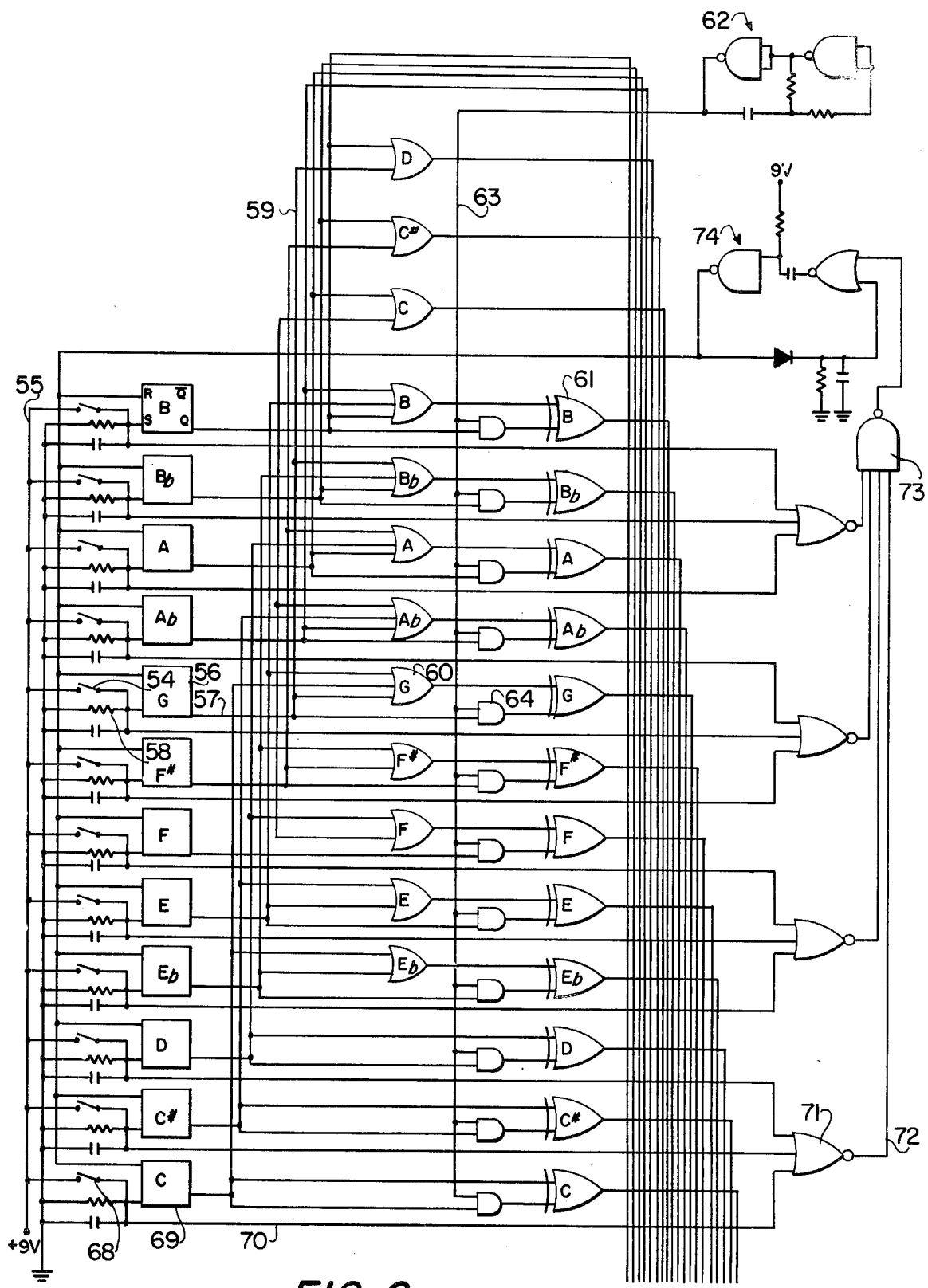
Figure 7:
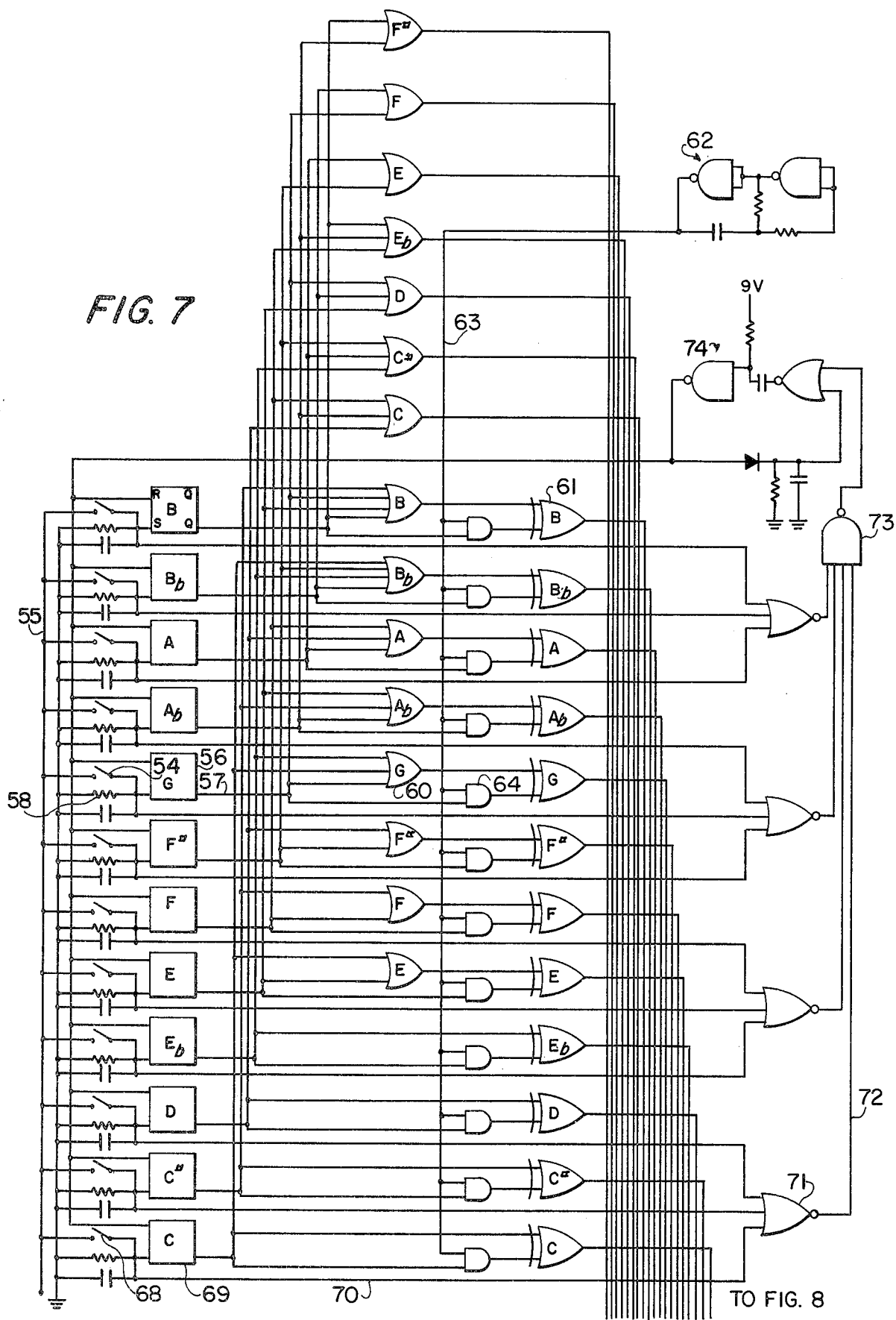

Turning to the embodiment illustrated in FIGS. 5, 6, 7 and 8, the relationship of these Figures will be best understood by first referring to FIG. 4 which diagrammatically sets forth their interconnection. FIGS. 5, 6 and 7 represent, respectively, the major, minor, and seventh rows of the keyboard, all of which are connected to the indicator circuitry. In reality, the circuitry of FIGS. 5 through 8 is all incorporated in a single integrated circuit but is partitioned in this specification for purposes of clarity and compliance with applicable size requirements for patent drawings.

The keying circuitry of FIG. 5 is similar to the aforedescribed keying circuitry of FIG. 2 in that depression of a key 11 closes its associated switch 54 to connect a positive bus 55 to the set input of flip flop 56, which again may be one half of an RCA No. 4013 dual D-type. Application of the positive voltage to the set input of 56 for the key of G, for instance, causes that flip-flop to change state at the Q output conductor 57. Upon subsequent opening of the switch 54, the signal at the set input to 56 is bled to ground through resistor 58, the flip-flop remaining in its triggered logic state. The Q output at conductor 57 is applied through conductor 59 to an input of OR elements 60 for each of the chord triad notes G, B, and D. Each OR element 60 may be a COS/MOS gate comprising three inputs, the energization of any one of which causes a change in logic level at the output. Thus, output signals are present at the outputs of the OR elements 60 for the notes G, B and D, and each said output is fed directly to one input of a corresponding Exclusive-OR gate 61, which gate is characterized by providing an output when one or the other input is energized, but not when both are energized. This gate may be one-fourth of an RCA type CD4030.

The keying circuits of FIGS. 5, 6 and 7 are also provided with means to cause the chord note indicator for the individual note within the triad which corresponds to the depressed key (i.e., the note by which the chord identification is confirmed) to flash, thus distinguishing it from the other indicators which are illuminated in a steady state. To this end, there is provided a blanking generator generally indicated at 62 which is a conventional arrangement of two gates connected as an astable multivibrator. The blanking generator provides a pulsating signal which is fed via conductor 63 to one input of each AND gate 64, one of which is associated with each key circuit. However, inasmuch as the other input to AND gate 64 is derived from its associated flip-flop 56 through conductor 57, the only AND gate 64 which receives two simultaneous inputs and thus provides an output is that gate which is associated with the depressed key, i.e., the note by which the chord is identified. In this instance, only the AND gate 64 associated with the key of G provides an output, and this output is provided only during the duration of a pulse at its input derived from the blanking generator 62 through conductor 63. The result is a pulsating output at AND gate 64 for the key of G, and no output at any other gate 64.

It has already been stated that the output of each OR element 60 is applied to one input of its respective Exclusive-OR gate 61. Now, it can be seen that the output of each AND gate 64 is fed to the other input of the respective Exclusive-OR gate 61. Thus, all gates 61 associated with keys not involved in the keyed chord (in the example of the chord G, the keys G, B and D) receive no input and hence provide no output. The gates 61 associated with the keys B and D each receive one input from respective OR elements 60 and no input from AND gate 64, and hence provide a steady state output in accordance with the exclusive-OR logic function. However, the gate 61 for the key G receives the input from its associated OR element 60 and additionally receives a pulsating input from AND gate 64. Stated again in accordance with the exclusive-OR logic function, an output will be provided during the interval between pulses from AND gate 64, but throughout the duration of the pulse when two simultaneous inputs are present, the gate 61 will provide no output. The result is the provision of a pulsating output for the key of G, a steady state output for the keys of B and D, and no output at any other gate 61. These outputs are fed to the indicator circuitry depicted schematically in FIG. 8, where they are applied to respective OR gates 65 which serve to isolate the outputs from the keyboards of FIGS. 5, 6 and 7 from one another. Outputs from any keyboard will be fed by OR gates 65 through respective inverting buffer amplifiers 66 and corresponding driving transistors 67 to LEDs 12 in the same manner as set forth in respect to FIGS. 2 and 3. The ultimate effect is an activation of the indicators for the notes G, B and D in which only the indicator for G is activated intermittently.

Returning to a consideration of FIG. 5, it has been pointed out that a flip-flop 56, once energized, assumes its changed logic state and remains in that state after reopening of the key switch 54. Thus, the aforedescribed energization of the display remains latched. To the end that the latched condition will be released upon subsequent depression of another key, a reset circuit is provided by which a reset pulse of short duration is applied to every flip-flop 56 upon depression of any key. In operation, the closure of another key switch, say switch 68 for C chord not only applies the voltage of bus 55 to the set input of its flip-flop 69 to activate indicators for C, E and G in the aforedescribed manner, but also applies the voltage of bus 55 through conductor 70 to an input of NOR gate 71. This creates an output at 72 which is applied to an input of AND gate 73, again creating an output which is fed to a one-shot multivibrator indicated generally at 74. This one-shot circuit functions as described in connection with FIG. 3 to apply a reset pulse to the reset input of every flip-flop 56, 69, etc. Upon reset, all latched on indicators are released. However, the reset pulse is of extremely short duration, and the relatively slow manipulative action of the student's finger results in an application of the voltage of bus 55 to the set input of flip-flop 69 which outlasts the momentary reset pulse and establishes the changed indication for the key of C. On the other hand, as outlined in connection with FIG. 3, when the subsequent keying is for the same chord or for a chord that includes notes common to those of the latched display, no change is evident in the indicators for the common notes.

For purposes of clarity, a separate blanking generator 62 and a separate one-shot reset pulse generator 74 have been shown for each keyboard, i.e., for each of FIGS. 5, 6, and 7. In actual practice, one blanking generator 62 and, more importantly, one reset pulse generator 74 serves all three keying circuits so that the depression of a key in any keyboard row is effective to reset flip-flops for all keyboard rows.

Figure 9:
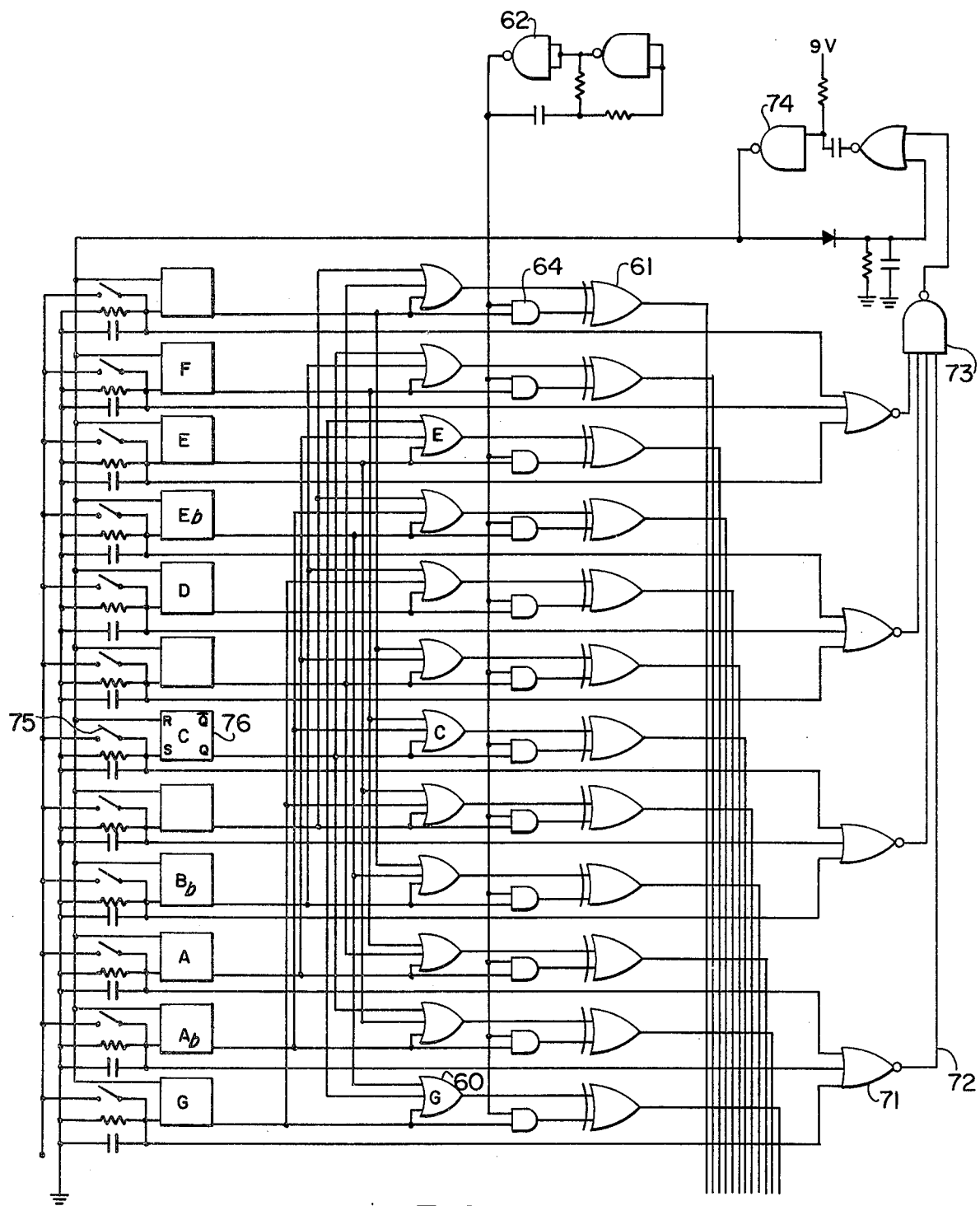
FIG. 9 is a schematic diagram similar to FIG. 5 for indicating major chords including 1st and 2nd inversions.

The keying systems of FIGS. 5, 6 and 7 provide indications of most chords in the fundamental mode (A, A# and B are in an inversion), whereas the circuitry of FIGS. 2 and 3 indicate the fundamental mode (G–B$_b$), second inversion (C–D) and first inversion (E$b$ –F). A still further embodiment set forth in FIG. 9 operates in the same manner as FIGS. 5, 6 and 7, but is modified to provide the indications as set forth in FIGS. 2 and 3. In the interest of avoiding repetition and in view of the identity of operation with previously described keying circuitry, explanation will be confined to pointing out that the circuit of FIG. 9 spans the same octave as FIGS. 2 and 3, but functions as FIGS. 5, 6 and 7 as to the latching, reset, and blanking circuitry. Thus, as an example, depression of the key for C in FIG. 9 closes switch 75 to change the logic state of flip-flop 76, the Q output of which energizes the OR elements 60 for the notes C and E in the same manner as in FIG. 5, but is connected to the element 60 for the note G which is lower in the scale than the key C, rather than higher as in FIG. 5. This simply reflects the second inversion of this chord, the interconnections for other chords being evident by reference to the respective schematics.

The aforedescribed invention provides a readily portable device which may be carried with the student for use as a study aid in learning chord structure. Its simplicity and compactness imparts to it particular value in that it does not require the presence of a musical instrument, an elaborate set-up, the use of charts or sheet music, a power source, etc. Consequently, a student may make use of spare time even when his spare time is in scattered intervals of short duration which find him in odd locations not otherwise conducive to learning of this nature.

The aforedescribed logic circuitry is set forth in detail in order to present a fully enabling disclosure, the details thereof forming no part of the herein claimed invention, the scope of which is to be determined by reference to the following claims.

I claim:

1. A study aid for use in self instruction in the makeup of musical chord triads, said study aid comprising a self-contained unit including a relatively flat casing dimensioned appropriately for carrying in a pocket, said casing having A. a face surface including
     A. a display panel in a format representative of keys of a musical instrument keyboard and including
       a. indicia of the respective notes represented by said format of keys, b. light indicators respectively associated with said note representations B. a series of push-buttons representative of notes by which chords are identified, said study aid further including C. means responsive to the depression of a selected push-button to provide a signal, D. means responsive to said signal to activate a certain plurality of said light indicators which correspond to the notes of the chord identified by said depressed push-button, said plurality including one indicator for the note representation which corresponds to said key, and E. latch means effective to retain said certain plurality of chord note indicators in said activated state.

2. The study aid set forth in claim 1 including means responsive to a subsequent said signal derived from sensing depression of a push-button and effective to release said latch means.

3. The study aid of claim 2 wherein said latch release means is effective only momentarily, and wherein said signal derived from said sensing means outlasts said momentary effectiveness of said latch release means, whereby a subsequent depression of the same said push-button effectively defeats release of said latch means whereas a subsequent depression of a different push-button and consequent release of said latch means simultaneously activates and latches a different plurality of said chord triad note indicators.

4. The study aid set forth in claim 2 and including additional light indicators, said additional light indicators disposed within each said push-button, and means responsive to said signal and effective to activate the said additional light indicator within said depressed push-button, said latch means also effective to retain said activated state of said additional light indicator.

5. The study aid set forth in claim 4 including means responsive to a subsequent said signal derived from sensing depression of a push-button and effective to release said latch means.

6. The study aid of claim 4 wherein said latch release means is effective only momentarily, and wherein said signal derived from said sensing means outlasts said momentary effectiveness of said latch release means, whereby a subsequent depression of the same said push-button effectively defeats release of said latch means whereas a subsequent depression of a different push-button and consequent release of said latch means simultaneously activates and latches a different plurality of said chord triad note indicators.

7. The study aid set forth in claim 1 and including means also responsive to said signal and effective to cause the activation of said included one indicator to be intermittent.

8. The study aid set forth in claim 2 and including means also responsive to said signal and effective to cause the activation of said included one indicator to be intermittent.

9. The study aid set forth in claim 3 and including means also responsive to said signal and effective to cause the activation of said included one indicator to be intermittent.

* * * * *